US012621752B2

(12) United States Patent
Lee et al.

(10) Patent No.: US 12,621,752 B2
(45) Date of Patent: May 5, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Sangheun Lee, Seoul (KR); Jaekyu Yu, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 18/232,070

(22) Filed: Aug. 9, 2023

(65) Prior Publication Data

US 2024/0129833 A1 Apr. 18, 2024

(30) Foreign Application Priority Data

Oct. 18, 2022 (KR) ........................ 10-2022-0133841

(51) Int. Cl.
H04W 48/10 (2009.01)
H04W 48/16 (2009.01)

(52) U.S. Cl.
CPC ........... H04W 48/10 (2013.01); H04W 48/16 (2013.01)

(58) Field of Classification Search
CPC ...... H04W 48/10; H04W 48/16; H04H 60/74; H04H 20/62; H04H 60/50; H04H 60/51; H04H 60/58; H04H 60/78; H04H 20/57; H04H 60/41; H04H 2201/60; G10L 25/51
See application file for complete search history.

(56) References Cited

U.S. PATENT DOCUMENTS

2022/0417700 A1* 12/2022 Lee ........................ H04H 20/71

* cited by examiner

*Primary Examiner* — Diane D Mizrahi
(74) *Attorney, Agent, or Firm* — MORGAN, LEWIS & BOCKIUS LLP

(57) ABSTRACT

The vehicle according to an embodiment of the disclosure includes a display device, a communicator configured to receive location information of the vehicle, a tuner configured to receive a radio frequency signal, a database including a plurality of broadcasting information which are categorized by area, and a controller configured to generate a first broadcast station list including a plurality of first broadcasting information corresponding to the location information of the vehicle and the radio frequency signal among the plurality of the broadcasting information included in the database, generate a second broadcast station list including broadcast station names in the first broadcast station list with different frequency information from the first broadcast station list, compare audio sound transmitted from the vehicle with audio sounds transmitted from broadcast stations of the broadcast station names included in the second broadcast station list to determine a current broadcast station name in an electric field overlapping area, and control the display device to display the determined current broadcast station name.

16 Claims, 11 Drawing Sheets

| (a) | (b) | (c) | (d) |
| FREQUENCY (MHz) | FIRST COVERAGE AREA | SECOND COVERAGE AREA | BROADCAST STATION NAME | BROADCAST STATION LOCATION |
|---|---|---|---|---|
| 97.3 | GANGWON-DO | WONJU-SI | KBS 1FM(Classic FM) | GANGNEUNG |
| 98.9 | GANGWON-DO | WONJU-SI | MBC FM4U | WONJU |
| 99.1 | GANGWON-DO | WONJU-SI | GUGAK FM | METROPOLITAN |
| 99.5 | GANGWON-DO | IRWON | KBS 1 RADIO | CHUNCHEON |
| 100.9 | GANGWON-DO | IRWON | FEBC FM | YEONGDONG |
| 101.3 | GANGWON-DO | WONJU-SI | TBS eFM | METROPOLITAN |
| 102.1 | GANGWON-DO | IRWON | KBS 2 RADIO (Happy FM) | GANGNEUNG |
| 107.1 | GANGWON-DO | IRWON | EBS FM | GANGNEUNG |
| 92.1 | GANGWON-DO | WONJU-SI | KBS 1 RADIO | CHUNGJU |
| 93.5 | GANGWON-DO | WONJU-SI | TBN FM | CHUNGCHEON GBUK-DO |
| 97.3 | GANGWON-DO | WONJU-SI | KBS 1 RADIO | METROPOLITAN |
| 97.9 | GANGWON-DO | WONJU-SI | CJB FM | CHEONGJU |
| 103.3 | GANGWON-DO | WONJU-SI | KBS 1 RADIO | CHUNGJU |
| 105.5 | GANGWON-DO | IRWON | TBN FM | GANGWON |
| 106.1 | GANGWON-DO | WONJU-SI | KBS 2 RADIO (Happy FM) | METROPOLITAN |

| (a) | (b) | | (c) | (d) |
| FREQUENCY (MHz) | FIRST COVERAGE AREA. | SECOND COVERAGE AREA. | BROADCAST STATION NAME | BROADCAST STATION LOCATION |
|---|---|---|---|---|
| 97.3 | GANGWON-DO | WONJU-SI | KBS 1FM(Classic FM) | GANGNEUNG |
| 98.9 | GANGWON-DO | WONJU-SI | MBC FM4U | WONJU |
| 99.1 | GANGWON-DO | WONJU-SI | GUGAK FM | METROPOLITAN |
| 99.5 | GANGWON-DO | IRWON | KBS 1 RADIO | CHUNCHEON |
| 100.9 | GANGWON-DO | IRWON | FEBC FM | YEONGDONG |
| 101.3 | GANGWON-DO | WONJU-SI | TBS eFM | METROPOLITAN |
| 102.1 | GANGWON-DO | IRWON | KBS 2 RADIO (Happy FM) | GANGNEUNG |
| 107.1 | GANGWON-DO | IRWON | EBS FM | GANGNEUNG |
| 92.1 | GANGWON-DO | WONJU-SI | KBS 1 RADIO | CHUNGJU |
| 93.5 | GANGWON-DO | WONJU-SI | TBN FM | CHUNGCHEONGBUK-DO |
| 97.3 | GANGWON-DO | WONJU-SI | KBS 1 RADIO | METROPOLITAN |
| 97.9 | GANGWON-DO | WONJU-SI | CJB FM | CHEONGJU |
| 103.3 | GANGWON-DO | WONJU-SI | KBS 1 RADIO | CHUNGJU |
| 105.5 | GANGWON-DO | IRWON | TBN FM | GANGWON |
| 106.1 | GANGWON-DO | WONJU-SI | KBS 2 RADIO (Happy FM) | METROPOLITAN |

FIG. 6

| (a) | (b) | | (c) | (d) |
|---|---|---|---|---|
| FREQUENCY (MHz) | FIRST COVERAGE AREA, | SECOND COVERAGE AREA, | BROADCAST STATION NAME | BROADCAST STATION LOCATION |
| 97.3 | GANGWON -DO | WONJU-SI | KBS 1FM(Classic FM) | GANGNEUNG |
| 97.3 | GANGWON -DO | WONJU-SI | KBS 1 RADIO | METROPOLITAN |

FIG. 8

| FREQUENCY (MHz) | FIRST COVERAGE AREA. | SECOND COVERAGE AREA. | BROADCAST STATION NAME | BROADCAST STATION LOCATION | |
|---|---|---|---|---|---|
| 89.1 | GANGWON-DO | WONJU-SI | KBS 1FM(Classic FM) | GANGNEUNG | |
| 89.5 | GANGWON-DO | WONJU-SI | KBS 1FM(Classic FM) | WONJU | (a) |
| 91.1 | GANGWON-DO | WONJU-SI | KBS 1FM(Classic FM) | CHUNCHEON | |
| 97.3 | GANGWON-DO | WONJU-SI | KBS 1FM(Classic FM) | GANGNEUNG | |
| 100.3 | GANGWON-DO | WONJU-SI | KBS 1FM(Classic FM) | CHUNGJU | |
| 90.3 | GANGWON-DO | WONJU-SI | KBS 1 FM | METROPOLITAN | |
| 90.7 | GANGWON-DO | WONJU-SI | KBS 1 FM | CHUNGJU | |
| 92.1 | GANGWON-DO | WONJU-SI | KBS 1 FM | CHUNGJU | |
| 95.5 | GANGWON-DO | WONJU-SI | KBS 1 FM | WONJU | |
| 97.1 | GANGWON-DO | WONJU-SI | KBS 1 FM | WONJU | (b) |
| 97.1 | GANGWON-DO | WONJU-SI | KBS 1 FM | WONJU | |
| 97.3 | GANGWON-DO | WONJU-SI | KBS 1 FM | METROPOLITAN | |
| 99.5 | GANGWON-DO | WONJU-SI | KBS 1 FM | CHUNCHEON | |
| 103.3 | GANGWON-DO | WONJU-SI | KBS 1 FM | CHUNGJU | |

FIG. 10

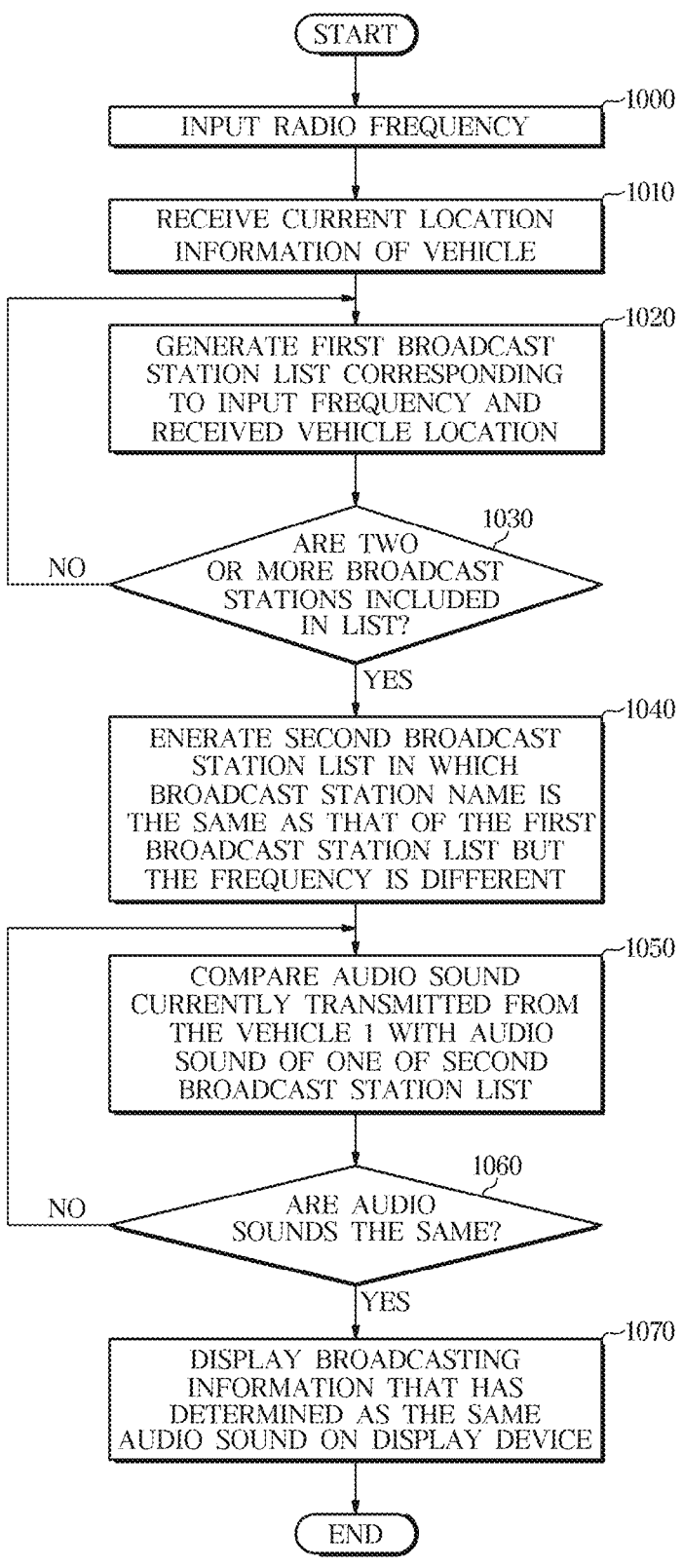

START

INPUT RADIO FREQUENCY ~1000

RECEIVE CURRENT LOCATION INFORMATION OF VEHICLE ~1010

GENERATE FIRST BROADCAST STATION LIST CORRESPONDING TO INPUT FREQUENCY AND RECEIVED VEHICLE LOCATION ~1020

ARE TWO OR MORE BROADCAST STATIONS INCLUDED IN LIST? 1030 — NO

YES

ENERATE SECOND BROADCAST STATION LIST IN WHICH BROADCAST STATION NAME IS THE SAME AS THAT OF THE FIRST BROADCAST STATION LIST BUT THE FREQUENCY IS DIFFERENT ~1040

COMPARE AUDIO SOUND CURRENTLY TRANSMITTED FROM THE VEHICLE 1 WITH AUDIO SOUND OF ONE OF SECOND BROADCAST STATION LIST ~1050

ARE AUDIO SOUNDS THE SAME? 1060 — NO

YES

DISPLAY BROADCASTING INFORMATION THAT HAS DETERMINED AS THE SAME AUDIO SOUND ON DISPLAY DEVICE ~1070

END

VEHICLE AND METHOD OF CONTROLLING THE SAME

CROSS-REFERENCE TO RELATED APPLICATION(S)

This application claims the benefit of Korean Patent Application No. 10-2022-0133841, filed on Oct. 18, 2022 in the Korean Intellectual Property Office, the entire contents of which application are incorporated herein by reference.

TECHNICAL FIELD

The present disclosure relates to a vehicle for displaying radio broadcasting information, and a method of controlling the same.

BACKGROUND

Generally, vehicles enable to basically have not only a driving function, but also perform additional functions for user convenience, such as audio, video, navigation, air conditioning, broadcasting, seat heating, communicating with external terminals, and the like.

In the case of performing at least one of an audio function, a video function, and a broadcasting function, a vehicle receives broadcasting signals of any one of traffic broadcasting, news broadcasting, television (TV) broadcasting, and radio broadcasting transmitted from broadcast stations, and outputs the received broadcasting signals using at least one of the audio device and the video device.

However, if a vehicle enters an electric field overlapping area in listening a radio broadcasting, the name of a radio station may not be displayed to a user because the exact name of a broadcast station may not be known in the related art, leading to causing inconvenience of the user.

SUMMARY

An aspect of the present disclosure provides a vehicle configured for determining a current broadcast station name in an electric field overlapping area.

Another aspect of the present disclosure provides a vehicle configured for controlling a display device to display the determined current broadcast station name as a text or a thumbnail image.

Additional aspects of the present disclosure are set forth in part in the description which follows and, in part, should be understood from the description, or may be learned by practice of the disclosure.

In accordance with an aspect of the present disclosure, a vehicle includes a display device, a communicator configured to receive location information of the vehicle, a tuner configured to receive a radio frequency signal, a database including a plurality of broadcasting information which are categorized by area, and a controller configured to generate a first broadcast station list including a plurality of first broadcasting information corresponding to the location information of the vehicle and the radio frequency signal among the plurality of broadcasting information included in the database, generate a second broadcast station list including broadcast station names in the first broadcast station list with different frequency information from the first broadcast station list, compare audio sound transmitted from the vehicle with audio sounds transmitted from broadcast stations of the broadcast station names included in the second broadcast station list to determine a current broadcast station name in an electric field overlapping area, and control the display device to display the determined current broadcast station name.

The controller may determine a broadcast station name of a broadcast station transmitting the same audio sound as the audio sound transmitted from the vehicle, among the broadcast station names in the second broadcast station list, as the current broadcast station name in the electric field overlapping area.

The vehicle may further include a sub tuner, and the controller may further receive audio sound signals transmitted from broadcast stations of the broadcast station names included in the second broadcast station list through the sub tuner, and determine, if at least one of the audio sound signals received through the sub turner corresponds to the audio sound signal transmitted from the vehicle, that the audio sound transmitted from the vehicle and at least one audio sound of the second broadcast station list are the same.

The controller may determine a priority of each of a plurality of second broadcasting information included in the second broadcast station list, and compare an audio sound of of at least one of the plurality of second broadcasting information having a highest priority with the audio sound transmitted from the vehicle.

The controller may determine broadcasting information having the same broadcast station location as the first broadcast station list among the plurality of second broadcasting information included in the second broadcast station list to have a first priority.

The controller may determine broadcasting information having a high electric field strength received by the vehicle among the plurality of second broadcasting information included in the second broadcast station list to have a second priority.

The plurality of the first broadcasting information may include at least one of radio frequency information, radio transmission area information, and broadcast station location information.

The controller may control the display device to display broadcasting information corresponding to the determined current broadcast station name as text or a thumbnail image.

The broadcasting information corresponding to the determined current broadcast station name may include at least one of a program name, a host, and air time.

In accordance with another aspect of the present disclosure, a method of controlling a vehicle including a display device, a communicator for receiving location information thereof, and a tuner for receiving a radio frequency signal, is provided. The method includes generating a first broadcast station list including a plurality of first broadcasting information corresponding to the location information of the vehicle and the radio frequency signal, generating a second broadcast station list including broadcast station names in the first broadcast station list with different frequency information from the first broadcast station list, determining a current broadcast station name in an electric field overlapping area by comparing audio sound transmitted from the vehicle with audio sounds transmitted from broadcast stations of the broadcast station names included in the second broadcast station list, and displaying the determined current broadcast station name.

The determining of the current broadcast station name may further include determining a broadcast station name of a broadcast station transmitting the same as the audio sound transmitted from the vehicle, among the broadcast station names in the second broadcast station list, as the current broadcast station name in the electric field overlapping area.

The method may further include receiving audio sound signals transmitted from broadcast stations of the broadcast station names included in the second broadcast station list through a sub tuner, and determining, if at least one of the audio sound signals received through the sub turner corresponds to the audio sound signal transmitted from the vehicle, that the audio sound transmitted from the vehicle and at least one audio sound of the second broadcast station list are the same.

The comparing of the audio sound transmitted from the vehicle with the audio sound transmitted from the broadcast stations of the broadcast station names included in the second broadcast station list may further include determining a priority of each of a plurality of second broadcasting information included in the second broadcast station list, and comparing an audio sound corresponding to the broadcasting information having a highest priority with the audio sound transmitted from the vehicle.

The method may further include determining broadcasting information having the same broadcast station location as the first broadcast station list, among the plurality of second broadcasting information included in the second broadcast station list, to have a first priority.

The method may further include determining broadcasting information having a high electric field strength received by the vehicle among the plurality of second broadcasting information included in the second broadcast station list to have a second priority.

The plurality of the first broadcasting information may include at least one of radio frequency information, radio transmission area information, and broadcast station location information.

The displaying of the determined broadcast station name may further include controlling the display device to display the broadcasting information corresponding to the determined current broadcast station name as text or a thumbnail image.

The broadcasting information corresponding to the determined current broadcast station name may include at least one of a program name, a host, and air time.

BRIEF DESCRIPTION OF THE DRAWINGS

These and/or other aspects of the disclosure should be apparent and more readily appreciated from the following description of the embodiments, taken in conjunction with the accompanying drawings, in which:

FIG. 5 is a view illustrating a database including broadcasting information by region according to an embodiment of the present disclosure;

FIG. 6 is a view illustrating a first broadcast station list corresponding to a current location and a current frequency of a vehicle from broadcasting information of a database according to an embodiment of the present disclosure;

FIG. 8 is a view illustrating a second broadcast station list in which a broadcast station name is the same as that of the first broadcast station list but a but a frequency thereof is different, among broadcasting information of a database according to an embodiment of the present disclosure;

FIG. 10 is a control flowchart of a method for controlling a vehicle according to an embodiment of the present disclosure.

DETAILED DESCRIPTION

Figure 1:
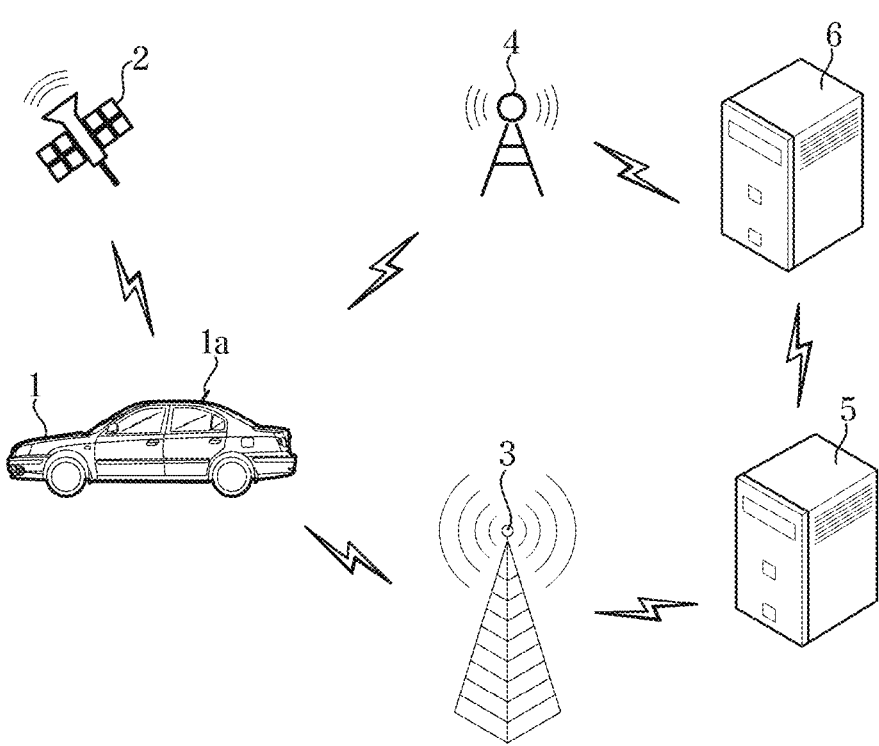
FIG. 1 is a view illustrating communication of a vehicle according to an embodiment of the present disclosure.

Reference is made below in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the disclosure are described in detail with reference to the accompanying drawings.

FIG. 1 is a view illustrating communication of a vehicle according to an embodiment.

Referring to FIG. 1, a vehicle 1 may perform communication with a satellite 2, a first infrastructure 3, and a second infrastructure 4.

The vehicle 1 may perform direct or indirect communication with a first server 5 and a second server 6.

When communicating with the satellite 2, the vehicle 1 may receive a signal from the satellite 2 and recognize a current location of the vehicle based on the received signal. In the instant case, the number of satellites 2 communicating with the vehicle 1 may be one or two or more.

When recognizing the current location, the vehicle 1 may recognize the current location of the vehicle using a global positioning system (GPS), a global navigation satellite system (GNSS), or a global navigation satellite system (GLO-NASS).

For example, when recognizing the current location thereof, the vehicle 1 may obtain distance and time information corresponding to signals of a plurality of GPS satellites and recognize the current location of the vehicle based on the obtained distance and time information.

As another example, the vehicle 1 may receive signals transmitted from a GNSS satellite and recognize the current location of the vehicle through a distance to the GNSS satellite.

When communicating with the first infrastructure 3, the vehicle 1 may emit a signal for information to be transmitted as electromagnetic waves through an antenna 1a. In other words, the antenna 1a of the vehicle may emit electromagnetic waves corresponding to electrical signals transmitted from a controller 110 provided in the vehicle 1.

The antenna 1a of the vehicle 1 demodulates the electromagnetic waves received from the first infrastructure 3 to convert the received electromagnetic waves into electrical signals, and then transmits the converted electrical signals to the controller 110. At this time, the vehicle 1 may obtain control signals corresponding to the converted electrical signals and control an operation of the vehicle 1 based on the obtained control signals.

The antenna 1a of the vehicle 1 may receive the electromagnetic wave signals transmitted from the second infrastructure 4. The vehicle 1 may convert the received electromagnetic wave signals into electrical signals, and output the converted electrical signals.

The antenna 1a of the vehicle 1 may be an antenna according to a second generation (2G) communication method, such as time division multiple access (TDMA) and code division multiple access (CDMA), a third generation (3G) communication methods, such as wide code division multiple access (WCDMA), CDMA 2000, wireless broadband (Wibro), and world interoperability for microwave access (WiMAX), and the like, a fourth generation (4G) communication method, such as long term evolution (LTE) and wireless broadband evolution, or a fifth generation (5G) communication method.

The vehicle 1 may transmit frequency and broadcast station information of a radio broadcast being output from the vehicle 1 to the first server 5 through connected car service (CCS) services, transmit location information of the vehicle 1 to the first server 5, and also transmit current time information and identification information of the vehicle 1 to the first server 5.

The satellite 2 transmits satellite signals to the vehicle 1 so that the vehicle 1 may recognize the current location of the vehicle.

The satellite 2 may be any one of a GNSS satellite, a GLONASS satellite, and a GPS satellite. The satellites 1 may be one or two or more.

The first infrastructure 3 may be provided on a road, and may be communicate with the first server 5 and transmit information transmitted from the first server 5 to the vehicle 1 and transmit information transmitted from the vehicle 1 to the first server 5. The information transmitted from the first server 5 may be broadcasting information.

The first infrastructure 3 may receive the electromagnetic waves emitted from the antenna 1a of the vehicle 1, transmit electrical signals corresponding to the received electromagnetic waves to the first server 5, and convert the electrical signals transmitted from the first server 5 into electromagnetic waves to emit the converted electromagnetic waves.

The second infrastructure 4 may be provided on a road, and may be communicate with the second server 6 and receive electromagnetic waves transmitted from the second server 6 and transmit the received electromagnetic waves. The electromagnetic waves transmitted from the second server 6 may be broadcast signals for radio broadcasting.

The second infrastructure 4 may be an infrastructure for receiving and transmitting broadcast signals.

The second infrastructure 4 may receive broadcast signals for radio broadcasting transmitted from a plurality of broadcast stations and transmit the received broadcast signals.

The second infrastructure 4 is a device that receives broadcast signals received through a broadcast station, a broadcast satellite, a cable, Internet, and the like and transmits the received broadcast signals, and may be a device that receives an external broadcast signal and transmits the received external broadcast signal again.

The first server 5 receives broadcasting information on the radio broadcast received from the second server 6, stores the received broadcasting information, and transmits the stored broadcasting information to the vehicle 1 through the first infrastructure 3.

Furthermore, the first server 5 stores broadcasting information provided from a plurality of second servers 6 and transmits the stored broadcasting information to the vehicle 1 through the first infrastructure 3.

The broadcasting information may include channel information, frequency information, broadcast station information, program information, and broadcasting time information, and the program information may include a program title and host information.

In addition, the broadcasting information may be displayed as at least one of text information and image information.

The image information may include a face image of a host and a symbol image corresponding to a program title.

The first server 5 may receive a schedule of radio broadcasts from the second server 6 of each broadcast station, and may download schedules known from web pages of each broadcast station.

The first server 5 may transmit broadcasting information of a radio broadcast to the vehicle 1 in response to a request of the vehicle 1.

In the instant case, the first server 5 may transmit broadcasting information of two or more radio broadcasts to the vehicle 1 in a region to which the current location of the vehicle 1 belongs. In other words, if the vehicle 1 requests broadcasting information in a specific region, the first server 5 may make a list of broadcasting information of two or more radio broadcasts and transmit the list to the vehicle 1.

The first server 5 may receive current location information, frequency information, and broadcasting information from a plurality of other vehicles other than the vehicle 1, identify a coverage area corresponding to the received current location information, and match and store the identified coverage area and the frequency information and the broadcasting information.

The second server 6 is a server provided in a broadcast station, and may store broadcasting information on radio broadcasting of the broadcast station and transmit the stored broadcasting information to the first server 5. The second server 6 may be provided in each of a plurality of broadcast stations. In other words, the number of second servers 6 may be plural.

The second server 6 may output broadcasting signals for radio broadcasting. In other words, the second server 6 may output broadcast signals of ongoing radio broadcasts as electromagnetic waves.

Figure 2:
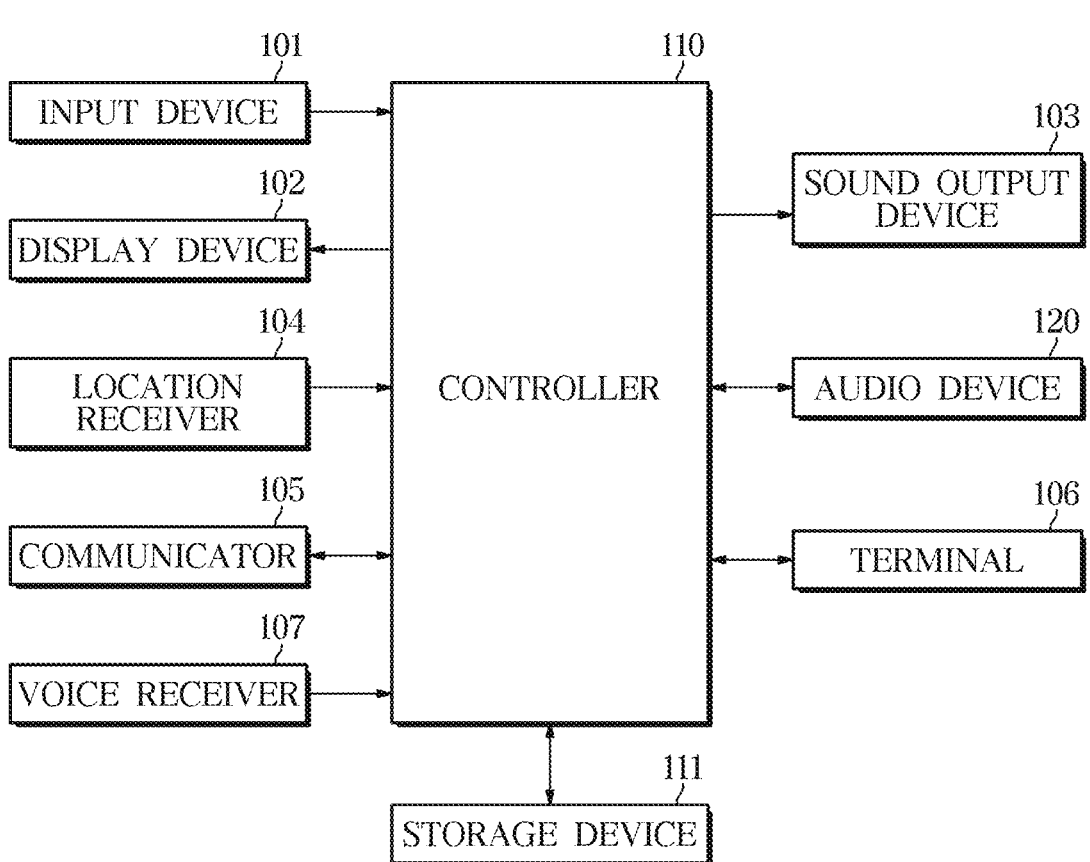
FIG. 2 is a view illustrating a control configuration of a vehicle according to an embodiment of the present disclosure.
Figure 3:
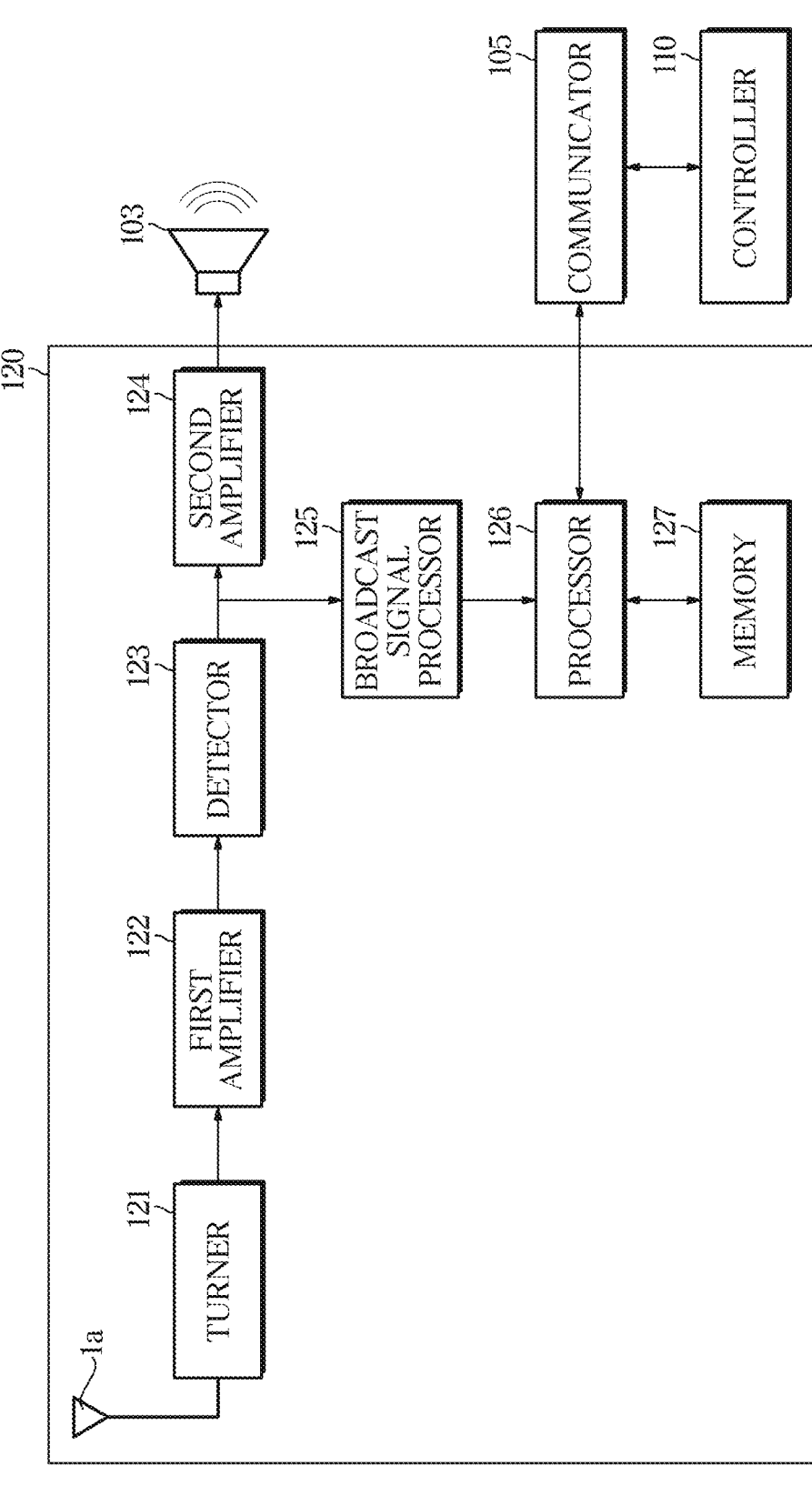
FIG. 3 is a detailed view illustrating a configuration of an audio device provided in a vehicle according to an embodiment of the present disclosure.

FIG. 2 is a view illustrating a control configuration of a vehicle according to an exemplary embodiment, and FIG. 3 is a detailed view illustrating a configuration of an audio device provided in a vehicle according to an exemplary embodiment.

Referring to FIG. 2 and FIG. 3, the vehicle may include an input device 101, a display device 102, a sound output device 103, a location receiver 104, a communicator 105, a terminal 106, a voice receiver 107, the controller 110, and a storage device 111, and an audio device 120.

The input device 101 receives a user input and transmits input information on the received user input to the controller 110.

The input device 101 may directly transmit the input information on user input to a processor 126 (please see FIG. 3) of the audio device.

The input device 101 receives an on/off command of a radio broadcasting mode and receives frequency information and volume information when the radio broadcasting mode is performed.

The input device 101 may also receive channel information for outputting the radio broadcast. For example, the channels may include a long wave channel, an amplitude (AM) channel, a shortwave channel, and a very high frequency (VFM) channel.

The input device 101 may also receive a command to change the radio broadcast. The command to change the radio broadcast may include a command to change a frequency.

The input device 101 may receive a command to display a plurality of broadcasting information while the radio broadcasting mode is being performed. The command to display broadcasting information may be a command to display broadcasting information regarding a currently outputting radio broadcast program.

The command to display broadcasting information may be a command to display broadcasting information on a previous program or a command to display broadcasting information a following program. The previous program may be a program corresponding to a frequency lower than the frequency of the currently outputting program.

The following program may be a program corresponding to a frequency higher than the frequency of the currently outputting program.

A current frequency, a frequency lower than the current frequency, and a frequency higher than the current frequency may be pre-stored information in order of size.

The current frequency, the frequency lower than the current frequency, and the frequency higher than the current frequency are frequencies receivable in the vehicle, and may be retrieved in order of size.

The input device 101 may receive the command to display broadcasting information corresponding to frequency information selected by a user. In addition, the input device 101 may receive a command to end the displaying of broadcasting information.

The input device 101 may receive a reservation command and reservation information of a radio broadcast, and a search command and search information of the radio broadcast.

The reservation information on radio broadcast may include a broadcasting time and may further include at least one of a broadcast station name, host, program title, and frequency.

The search information on the radio broadcast may include at least one of program information, broadcast station information, channel information, frequency information, host information, and broadcasting time information.

The input device 101 may also receive an operation command of the terminal 106. The input device 101 may receive a movement command and selection command of a cursor displayed on the terminal 106.

The input device 101 may be disposed on a center fascia and a head unit provided in an interior of a vehicle body, and may also be disposed on a steering wheel.

The input device 101 may include hardware devices, such as various buttons or switches, pedals, keyboards, mice, track-balls, levers, handles, sticks, or the like.

The input device 101 may include a graphical user interface (GUI), such as a touch pad, that is, a software device. The touch pad may be implemented as a touch screen panel (TSP) to form a multilayer structure with the display device 102.

The display device 102 displays operation information on functions being performed in the vehicle 1.

The display device 102 may display operation information of the head unit and input information input to the input device 101. For example, the display device 102 may display a channel and frequency input by a user and display a volume when the radio broadcasting mode is performed.

The display device 102 may display broadcasting information corresponding to frequency information selected by a user when the radio broadcasting mode is performed.

The display device 102 may display broadcasting information corresponding to other frequency information when the radio broadcasting mode is performed.

The display device 102 may display broadcast information of a radio broadcast output at the current location and a frequency of the same radio broadcast in another regions.

When the radio broadcasting mode is performed, the display device 102 may display schedules for radio broadcasts being conducted by a plurality of broadcast stations.

The display device 102 may display reserved reservation information and may display retrieved search information.

The display device 102 may display volume information when the radio broadcasting mode is performed.

The display device 102 may be disposed on at least one of a center fascia and a head unit provided inside a vehicle body, or may be provided on a cluster.

The display device 102 may include a cathode ray tube (CRT), a digital light processing (DLP) panel, a plasma display panel (PDP), a liquid crystal display (LCD) panel, an electroluminescence (EL) panel, an electrophoretic Display (EPD) panel, an electro chromic display (ECD) panel, a light emitting diode (LED) panel, or an organic light emitting diode (OLED) panel, or the like, but is not limited thereto.

The sound output device 103 outputs sound for a function being performed in the vehicle in response to a control command of the controller 110.

For example, the sound output device 103 may output an audio signal of navigation information as sound, output an audio signal of contents or external broadcasting as sound, or output an audio signal of music or radio broadcasting selected by a user as sound.

When the radio broadcasting mode is performed, the sound output device 103 may output sound as volume information selected by a user in response to a control command of the controller 110.

The sound output device 103 is connected to the audio device 120 to output an audio signal output from the audio device 120 as sound.

The sound output device 103 may also output sounds for reservation completion, search progress, and search completion.

The sound output device 103 may include one or two or more speakers.

The speaker converts the signal transmitted from a second amplifier 124 (please see FIG. 3) of the audio device into vibration of a diaphragm, generates dense waves in the air, and radiates sound waves.

The location receiver 104 receives a signal for the current location of the vehicle.

The location receiver 104 may include a satellite signal receiver for receiving signals from a plurality of satellites and a signal processing unit for processing the satellite signals acquired by the satellite signal receiver. The signal processing unit may include software for acquiring current location information of the vehicle using distance information and time information corresponding to location signals of the plurality of satellites, and an output unit for outputting the acquired current location information of the vehicle.

The location receiver 104 may directly transmit current location information of the vehicle to the processor 126 of the audio device 120.

The communicator 105 may include one or more components enabling communication with an external device, and may include, for example, at least one of a short-range communication module, a wired communication module, and a wireless communication module. Herein, the external device may be the satellite 2, the first and second servers 5 and 6, and the first and second infrastructures 3 and 4.

The short-range communication module may include various short-range communication modules that exchange signals using a wireless communication network at a short distance, such as a Bluetooth® module, an infrared communication module, a Radio Frequency Identification (RFID) communication module, a Wireless Local Access Network (WLAN) communication module, a Near Field Communication (NFC) module, and a Zigbee® communication module, and the like.

The wired communication modules may include various cable communications, such as Universal Serial Bus (USB), High Definition Multimedia Interface (HDMI), Digital Visual Interface (DVI), Recommended Standard (RS)-232, a power line communication, or a plain old telephone service (POTS) modules, as well as various wired communication modules, such as Controller Area Network (CAN) communication modules, Local Area Network (LAN) modules, Wide Area Network (WAN) modules, or Value Added Network (VAN) modules, and the like.

The wireless communication modules may include, in addition to the WiFi module and the WiBro module, Global System for Mobile communication (GSM), Code Division Multiple Access (CDMA), Wideband Code Division Multiple Access (WCDMA), Universal Mobile Telecommunications System (UMTS), Time Division Multiple Access (TDMA), or Long Term Evolution (LTE), and the like.

The communicator 105 may communicate with an external broadcast station. The communicator 105 may further include a broadcasting communication module, such as transport protocol experts group (TPEG) (e.g., DMB), Sirius XM® (SXM), and relational database service (RDS).

The terminal 106 may be an audio/video/navigation (AVN) device for performing audio, video, and navigation functions.

The terminal 106 may receive a user input and display operation information on at least one function selected by the user.

For example, the terminal 106 may receive an on/off command of a navigation mode and destination information and route selection information when the navigation mode is executed. The terminal 106 may display navigation information.

The terminal 106 may display operation information of a mode being performed, such as a broadcasting mode, an Internet search mode, and a call mode. Herein, the broadcasting mode may include a radio broadcasting mode, a ground radio wave broadcasting mode, a cable broadcasting mode, a satellite broadcasting mode, an internet broadcasting mode, an internet protocol (IP) broadcasting mode, and a digital multimedia broadcasting (DMB) mode.

When the radio broadcasting mode is performed, the terminal 106 may also display broadcasting information in response to a command of the controller 110.

The terminal 106 may also display broadcasting information transmitted from the audio device 120.

The terminal 106 may include a display panel. Furthermore, the terminal 106 may include a touch screen in which a touch panel is integrated with a display panel.

The voice receiver 107 receives a voice of a user.

The voice receiver 107 includes one or more microphones.

The voice receiver 107 may also include a microphone array.

The controller 110 may recognize a voice from the sound received by the voice receiver 107, recognize a user input based on the recognized voice, and transmit the recognized user input to at least one of the audio device 120 and the terminal 106.

The user input through voice recognition may include a reservation command and reservation information of a radio broadcast, and may include a search command and search information of a radio broadcast.

The user input through voice recognition may include selection information of any one of a plurality of radio broadcasting programs.

The controller 110 transmits input information input through the input device 101 to at least one of the audio device 120 and the terminal 106.

The controller 110 may also control operations of the audio device 120 and the terminal 106 based on the input information input through the input device 101.

When the radio broadcasting mode is performed, the vehicle 1 may output radio broadcasting using the audio device 120 or may output radio broadcasting using the terminal 106. In an embodiment, a case in which the radio broadcasting mode is performed through the audio device 120 will be described.

Upon receipt of the on command of the radio broadcasting mode through the input device 101, the controller 110 may transmit the on command of the received radio broadcasting mode to the audio device 120, and receipt of a channel and frequency through the input device 101, the controller 110 may transmit the received the channel and frequency to the audio device 120.

Upon receipt of a command to display broadcasting information of a radio broadcast through the input device 101, the controller 110 may request the first server 5 to provide the broadcasting information.

When requesting provision of the broadcasting information to the first server 5, the controller 110 may identify the current location information and frequency information of the vehicle and transmit the current location information and frequency information of the identified vehicle to the first server 5. The controller 110 may transmit current time information and vehicle identification information together when requesting the first server 5 to provide the broadcasting information.

The controller 110 may control the display device 102 or the terminal 106 to display the broadcasting information received from the first server 5.

At this time, the controller 110 may control the display device 102 or the terminal 106 to display the broadcasting information when any one of: the broadcasting information display command, the radio broadcasting change command, or the frequency change command is received through the input device 101.

In other words, the controller 110 may increase user convenience by displaying the broadcasting information not only when a user issues the broadcasting information display command, but also when a user inputs the frequency change command in order to change a radio broadcasting.

The controller 110 may identify a first coverage area and a second coverage area where the vehicle 1 is located based on the current location information of the vehicle 1. In the instant case, the first coverage area may be a 'province' unit depending on the administrative district of each country, and the second coverage area may be a 'city, town, and district' unit depending on the administrative district of each country.

The controller 110 may identify both the first and second coverage areas where the vehicle 1 is located and update location information of the vehicle 1 including the first coverage area and the second coverage area.

The controller 110 may receive database information corresponding to current location information of the vehicle 1 from the first server 5. In other words, the controller 110 may control the communicator 105 to receive the database information corresponding to a current location from the database information including broadcasting information by region from the first server 5.

Thereafter, the controller 110 may generate a first broadcast station list, which is broadcast station information corresponding to location information of the vehicle 1 and a radio frequency signal currently set by a user, among a plurality of pieces of the broadcasting information included in the received database. In other words, the first broadcast station list is a list of candidate broadcast stations for a broadcasting currently transmitted to the vehicle 1.

At this time, a method for generating the first broadcast station list by the controller 110 is not limited as long as it is a method of extracting desired data using functions, such as searching and sorting in database.

The controller 110 may generate a second broadcast station list of which a broadcast name thereof matches the broadcasting information included in the first broadcast station list but a frequency thereof is different. In other words, the second broadcast station list is a comparison broadcast station list for verifying currently transmitted broadcasting among the first broadcast station list.

The controller 110 may compare an audio sound currently transmitted from the vehicle 1 with audio sounds of the broadcast stations belonging to the second broadcast station list, and determine a name of a current radio station (or current broadcast station) in an electric field overlapping area. To compare audio sounds, the vehicle 1 according to an embodiment may further include a sub tuner, and the controller 110 may receive an audio sound signal transmitted from the broadcast station included in the second broadcast station list through the sub tuner, and determine, based on a correspondence between the received audio sound signal and the audio sound transmitted from the vehicle, whether the audio sound transmitted from the vehicle and the audio sound of the second broadcast station list are the same.

A specific embodiment in which the controller 110 determines the name of the current broadcast station in an electric field overlapping area will be described in detail with reference to FIG. 4 and the following drawings therefrom.

The controller 110 may be implemented with a memory (not shown) storing data for an algorithm or a program reproducing the algorithm for controlling operations of components in the vehicle 1, and a processor (not shown) performing the above-described operations using the data stored in the memory. In this case, the memory and the processor may be implemented as separate chips. Alternatively, the memory and the processor may be implemented as a single chip.

The storage device 111 may store vehicle identification information. The vehicle identification information may include a vehicle identification number, a manufacturing number, a model number, license plate information, a type of vehicle model, a model name of vehicle, and the like, and may further include user information.

The storage device 111 may store map information in which coverage areas are divided and may store a frequency table for each coverage area of the plurality of broadcast stations.

The storage device 111 may be implemented as at least one of a non-volatile memory device such as a cache, a Read Only Memory (ROM), a Programmable ROM (PROM), an erasable programmable ROM (EPROM), an Electrically Erasable Programmable ROM (EEPROM), and a flash memory, or a volatile memory device such as a Random Access Memory (RAM), or a storage medium such as a Compact Disk (CD)-ROM, but is not limited thereto. The storage device 111 may be a memory implemented as a separate chip from the processor described above in relation to the controller 110, or may be implemented as a single chip with the processor.

The audio device 120 may receive an external broadcast signal and output the received broadcast signal. The audio device 120 may be a radio device (not shown) provided in the head unit or may be an audio device (not shown) provided in the head unit. The audio device 120 may be provided in the terminal 106.

The audio device 120 may perform merely a function of receiving a frequency signal and outputting a radio broadcast as sound.

The audio device 120 may receive a frequency signal to output a radio broadcast as sound, display broadcasting information or a schedule based on a user input received by the input device 101 or the voice receiver 107, and perform reservation and search functions. In this case, the audio device may include an input device and a display device. Furthermore, the audio device may directly communicate with the input device and the display device.

A configuration of the audio device 120 will be described with reference to FIG. 3.

As shown in FIG. 3, the audio device 120 may include a tuner 121, a first amplifier 122, a detector 123, a second amplifier 124, a broadcast signal processor 125, a processor 126, and a memory 127. Herein, the second amplifier 124 may be provided in the sound output device 103.

Furthermore, as described above, for audio sound comparison, a plurality of tuners 121 including sub-tuners may be configured.

The audio device 120 may further include an input unit, a display unit, a communication unit, and a sound output unit, and may further include a location receiver.

The tuner 121 may be connected to a broadcasting antenna and receive broadcasting signals through the broadcasting antenna. Herein, the broadcasting antenna may receive broadcasting signals transmitted from the plurality of broadcast stations.

The tuner 121 may receive a broadcast signal corresponding to channel information and frequency information selected by a user while performing the radio broadcasting mode.

The first amplifier 122 amplifies a frequency signal received by the tuner 121.

The detector 123 demodulates the frequency signal amplified by the first amplifier 122 and outputs a signal in the audible frequency range.

The second amplifier 124 is connected between the detector 123 and the sound output device 103, amplifies the signal in the audible frequency range output from the detector 123, and transmits the amplified signal to a speaker that is the sound output device.

The broadcast signal processor 125 may process the demodulated signal demodulated by the detector 123 and transmit signal processing information to the processor 126.

The broadcast signal processor 125 may sample the demodulation signal, which is an analog signal output from the detector 123, into a digital signal, and obtain a signal strength of the sampled digital signal. The obtained signal strength may be electric field strength of the received signal.

Upon receipt of input information from the controller 110, the processor 126 may control execution of the radio broadcasting mode based on the received input information and transmit performance information to the controller 110 while the radio broadcasting mode is being performed.

The received input information may include a radio broadcast playback command, broadcasting information, volume information, and a radio broadcast stop command, and may include current location information.

The broadcasting information may include at least one of channel information, frequency information, broadcast station information, program information, broadcasting time information, and presenter information.

The processor 126 may activate the tuner 121, the first amplifier 122, the detector 123, and the broadcast signal processor 125 in response to the on command of the radio broadcasting mode.

The processor 126 may control the tuner 121 in order to receive a broadcast signal corresponding to the channel information and frequency information selected by a user, and may control output of the broadcast signal received by the tuner 121.

The channel information and frequency information selected by the user may be information received through the input device 101 or the voice receiver 107.

The channel information and frequency information selected by the user may be information received through the controller 110.

When at least one broadcasting information among the program information, the broadcast station information, the broadcast time information, and the host information is received, the processor 126 may identify the frequency information corresponding to the received at least one broadcasting information and control the tuner 121 based on the identified frequency information.

The processor 126 may allow a user to listen to the radio broadcast by controlling an output of an audio signal within the received broadcast signal.

The processor 126 may adjust output sound quality while controlling frequency maintenance when an electric field strength of the received signal is greater than or equal to an electric field strength of a reference received signal, and may automatically control frequency change or display a schedule (also referred to as program schedule) when the electric field strength of the received signal is less than the electric field strength of the reference received signal. Herein, the adjusting of the sound quality may include removing a noise signal from the broadcast signal.

When the electric field strength of the received signal is less than the electric field strength of the reference received signal, the processor 126 may determine whether the coverage area has changed based on the current location information, and upon determining that the coverage area has changed, identify frequency information for outputting the same radio broadcast as the radio broadcast before the change of coverage area based on the schedule of the changed coverage area, and control the turner 121 based on the identified frequency information.

The processor 126 may update the schedule for each coverage area.

Upon receipt of the broadcasting information display command, the processor 126 may identify the frequency information of the frequency signal received through the tuner 121, identify the broadcasting information corresponding to the identified frequency information, and transmit the identified broadcasting information to the controller 110.

The broadcasting information display command may be a command received through the input device 101 or the voice receiver 107.

The broadcasting information display command may be a command received through the controller 110.

The processor 126 may also control the display device 102 or the terminal 106 to display the broadcasting information.

Upon receipt of a schedule display command, the processor 126 may request the first server 5 to provide the schedule and transmit the schedule received from the first server to the controller 110.

The processor 126 may also control the display device 102 or the terminal 106 to display the schedule.

The schedule display command may be a command received through the input device 101 or the voice receiver 107.

The schedule display command may be a command received through the controller 110.

The processor 126 may also communicate with the first server 5 through the communicator 105. The processor 126 may communicate with the first server 5 through the communicator 105 and the first infrastructure 3 and may also communicate with the location receiver.

The processor 126 may request the first server 5 to provide the broadcasting information or the schedule.

When requesting the first server 5 to provide the broadcasting information, the processor 126 may identify the current location information and frequency information of the vehicle, and transmit the identified current location information and frequency information of the vehicle to the first server 5. When requesting the first server 5 to provide the broadcasting information, the processor 126 may transmit current time information and vehicle identification information together.

When requesting provision of broadcast information to the first server 5, the processor 126 may also transmit broadcast station information of the currently outputting radio broadcast to the first server.

The processor 126 may control the display device 102 or the terminal 106 to display the broadcasting information received from the first server 5.

The processor 126 may request the first server 5 to provide the schedule.

When requesting provision of the schedule to the first server 5, the processor 126 may identify the current location information of the vehicle and transmit the identified current location information of the vehicle to the first server 5. When requesting the provision of the schedule to the first server 5, the processor 126 may transmit current time information and vehicle identification information together.

Upon receipt of the schedule from the first server 5, the processor 126 may control the display device 102 or the terminal 106 to display the received schedule.

The processor 126 may identify the current location information of the vehicle based on a command to display a broadcast list, and display a radio broadcast list audible at the current location based on the identified current location information of the vehicle.

The memory 127 may store the schedule and may further store the vehicle identification information.

The memory 127 may also store the schedules for each coverage area.

At least one component may be added or deleted corresponding to performance of components of the vehicle shown in FIG. 2 and FIG. 3. In addition, it should be easily understood by those skilled in the art that the mutual positions of the components may be changed corresponding to the performance or structure of the system.

On the other hand, each component shown in FIG. 2 and FIG. 3 refers to software and/or hardware components such as a Field Programmable Gate Array (FPGA) and an Application Specific Integrated Circuit (ASIC).

With reference to FIG. 2 and FIG. 3, components controllable by the controller 110 of the vehicle and components controllable by the processor 126 of the audio device 120 have been described.

However, based on the function of the processor 123 of the audio device 120, an operation configuration between the controller 110 of the vehicle and the processor 126 of the audio device 120 may be different, which is briefly explain as follows.

An example in which the processor 126 of the audio device 120 performs only a function for outputting radio broadcast will be described.

The controller 110 of the vehicle may identify the user input received through the input device 101 and the user input corresponding to the voice received through the voice receiver 107, and control the audio device 120 based on the identified user input, thereby outputting the radio broadcast.

The processor 126 of the audio device 120 may identify the frequency information corresponding to the user input and control the tuner based on the identified frequency information, thereby outputting the radio broadcast.

The controller 110 of the vehicle may control at least one of the display device 102 and the terminal 106 in order to: communicate with the first server 5 through the first infrastructure 3, transmit the frequency information, the current location information, the vehicle identification information, and the current time information to the first server 5, and output the broadcasting information and schedule received from the first server 5.

The controller 110 of the vehicle may reserve the radio broadcast based on the reservation command and reservation information, and may control the radio device 120 based on the reservation information.

The controller 110 of the vehicle may search for the broadcasting information regarding radio broadcasts based on the search command and search information, and control at least one of the display device 102 and the terminal 106 to display the searched broadcasting information.

An example in which the processor 126 of the audio device 120 performs various control functions in addition to a function for outputting the radio broadcast will be described.

The controller 110 of the vehicle 1 may identify the user input received by the input device 101 and the user input corresponding to the voice received by the voice receiver 107, and transmit the identified user input to the audio device 120. Herein, the user input may include an on/off command, reservation command, reservation information, search information, search command, and broadcast information of the radio broadcasting mode.

The processor 126 of the audio device 120 may identify the frequency information corresponding to the user input, and control the tuner based on the identified frequency information, thereby outputting the radio broadcast.

The processor 126 of the audio device 120 may communicate with the first server 5 through the first infrastructure 3, provide the first server 5 with the frequency information, the current location information, the vehicle identification information, and the current time information, and transmit the broadcasting information and schedule received from the first server 5 to the controller 110.

At this time, the controller 110 may control at least one of the display device 102 and the terminal 106 to display the broadcasting information and schedule received from the processor 126.

The processor 126 of the audio device 120 may directly control at least one of the display device 102 and the terminal 106 to display the broadcasting information and schedule received from the first server 5.

The processor 126 of the audio device 120 may perform a reservation of the radio broadcast based on the reservation command and reservation information, control output of the radio broadcast based on the reservation information, and search for the radio broadcast based on the search command and search information.

The processor 126 of the audio device 120 may transmit broadcasting information on the searched radio broadcast to the controller 110. The controller 110 may control at least one of the display device 102 and the terminal 106 to display the received broadcasting information.

As described above, when the radio broadcast is output from the vehicle 1, the user may identify information about the outputting radio broadcast. Hereinafter, a method of identifying the same information in an electric field overlapping area will be described.

Figure 4A:
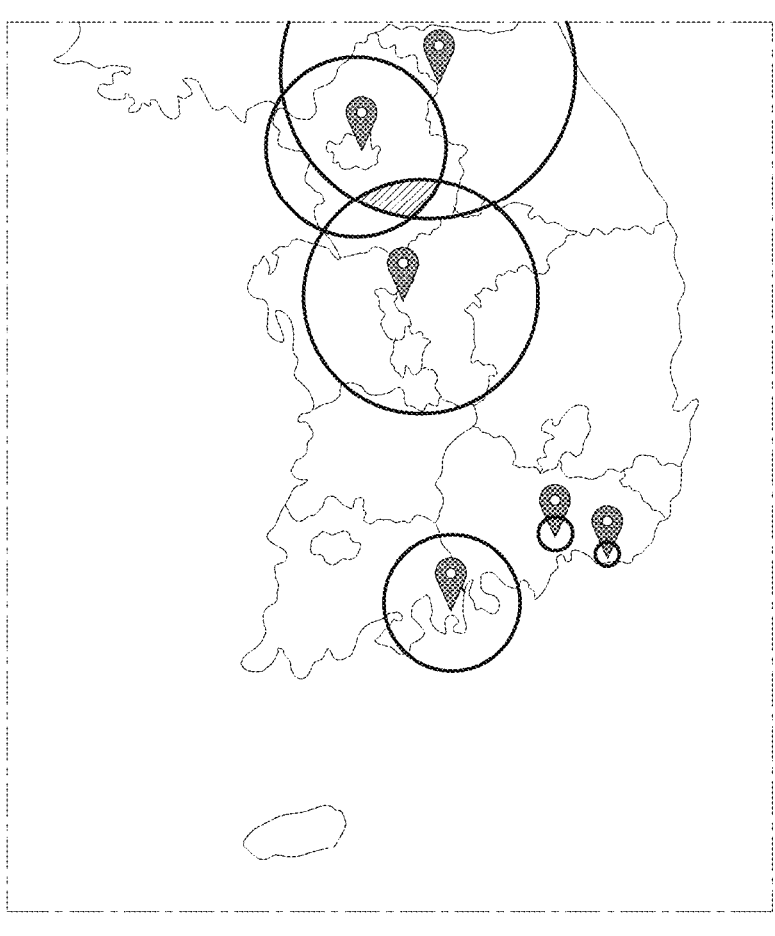
FIGS. 4A and 4B are views illustrating an electric field overlapping area according to an embodiment of the present disclosure.
Figure 4B:
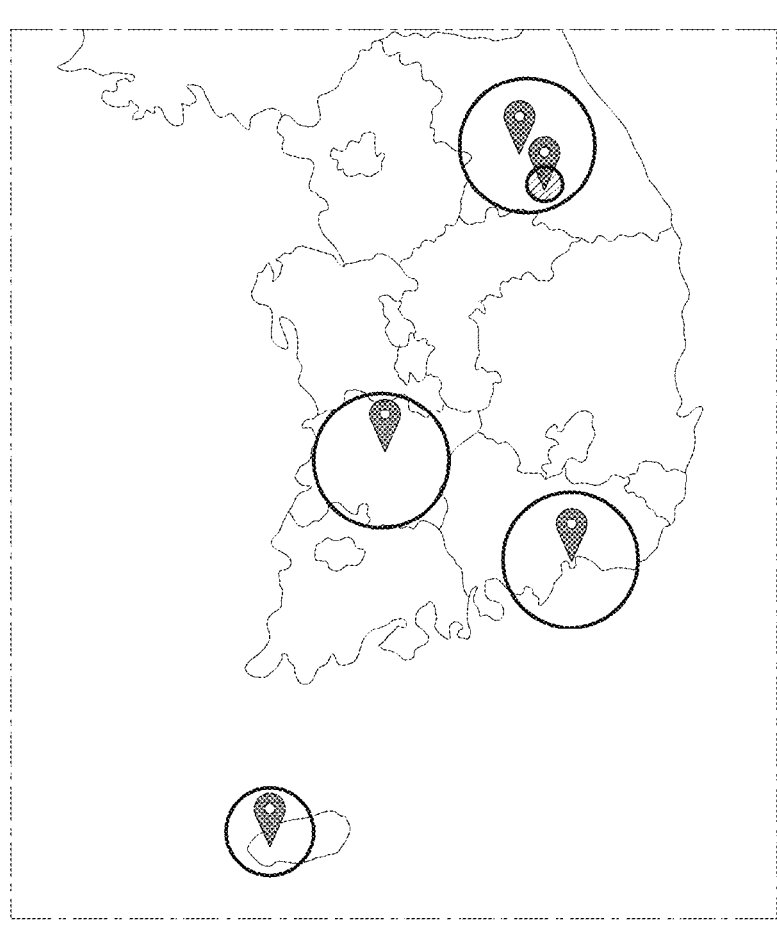

Referring to FIG. 4A and FIG. 4B, a method of displaying a broadcast station name when the vehicle 1 enters an electric field overlapping area will be described in detail. FIG. 4A and FIG. 4B are views illustrating the electric field overlapping area according to an exemplary embodiment.

Referring to FIG. 4A and FIG. 4B, it can be seen that the hatched area is the electric field overlapping area. For example, FIG. 4A is a case in which three electric field areas overlap, in particular an overlapping area (hatched area) occurs because a coverage of each transmitting station is different. In addition, FIG. 4B is a case in which two electric field areas overlap, in particular a transmitting station with a large coverage includes a transmitting station with a small coverage.

As such, the coverage area covering a region varies according to the location of each broadcast station and a strength of the electric field, and thus an overlapping area may occur. For example, when a radio broadcasting transmitted from a station located in Wonju, a radio broadcasting transmitted from a broadcast station located in the eastern side of Gyeonggi Province, and a radio broadcasting transmitted from a broadcast station located in Seoul have electric field strengths above a certain reference value, the electric fields of the three broadcastings may be overlapped.

Conventionally, there was no way to provide a user with the name of the currently transmitted radio station when electric field areas overlap, and radio information including the radio station name may be provided only after the vehicle 1 moved out of the electric field overlapping area.

Accordingly, the thing the radio station name may not be confirmed in the electric field overlapping area causes inconvenience to a user. A method of providing the radio station name in the electric field overlapping area will be described with reference to the following drawings from FIG. 5.

FIG. 5 is a view illustrating a database including broadcasting information by area according to an exemplary embodiment.

Referring to FIG. 5, when the vehicle 1 enters an electric field overlapping area, the controller 110 may request a database including broadcasting information corresponding to the first coverage area to the first server 5. For example, as shown in FIG. 5, when the vehicle 1 enters Gangwon-do, the controller 110 may request the database including a frequency (Mhz) of a radio broadcast included in the Gangwon-do region (a), a location of the vehicle (b), and a broadcast station name (c) to the first server 5.

In other words, the database requested by the controller 110 may include information (e.g., Gangwon-do) that is the same as the first coverage area to which the location of the vehicle (b) is belonged.

In this case, the database may be stored in the first server or may be stored in the storage device 111 of the vehicle 1.

The controller 110 may control the communicator 105 to receive broadcast station data corresponding to the first coverage area to which the location of the vehicle (b) is belonged, and from the data, calculate a first broadcast station list, which is a candidate list of broadcasts currently being transmitted in the electric field overlapping area.

Figure 7:
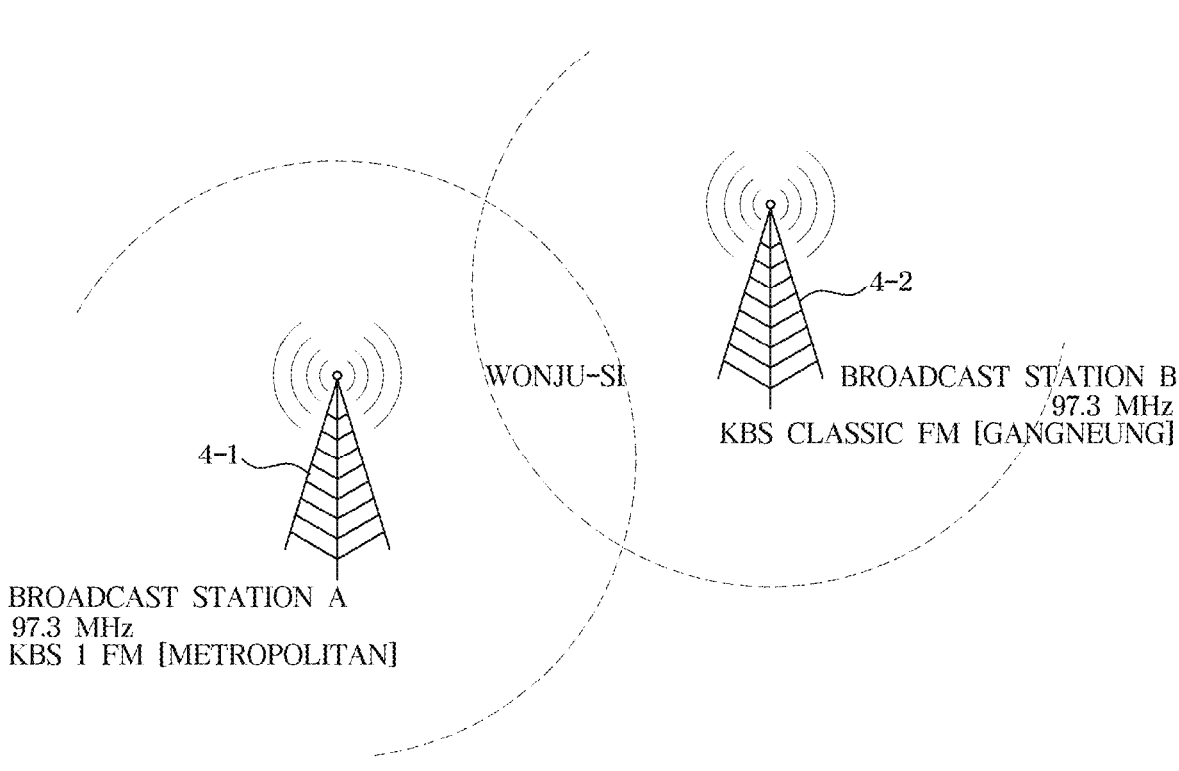
FIG. 7 is a view illustrating a first broadcast station list according to an embodiment of the present disclosure.

FIG. 6 is a view illustrating a first broadcast station list corresponding to a current location and a current frequency of a vehicle among broadcasting information of a database according to an exemplary embodiment, and FIG. 7 visually illustrates the first broadcast station list according to an exemplary embodiment. For example, the first broadcast station list may include a plurality of first broadcast information such as frequency (Mhz) information (a), location information (b), and broadcast station name information (c), and broadcast station location information (d).

Referring to FIG. 6, the controller 110 may calculate the first broadcast station list, which is a candidate list of electric field overlapping areas, based on the current frequency set by the user and the current location of the vehicle 1 determined by the location receiver 104.

For example, if the current frequency (a) set by the user is 97.3 MHz and the current location information (b) of the vehicle 1 determined by the location receiver 104 is 'Wonju-si, Gangwon-do', all broadcasting information in which the frequency (a) is 97.3 MHz and the location information (b) corresponds to 'Wonju-si, Gangwon-do' may be included in the first broadcast station list.

Accordingly, the controller 110 may determine candidates for broadcasts currently being transmitted in the electric field overlapping area, and the first broadcast station list may include frequency (Mhz) information (a), location information (b), and broadcast station name information (c), and broadcast station location information (d) of candidate broadcasts.

Referring to FIG. 7, a coverage of broadcast station A may overlap with that of broadcast station B. For example, a location of a first infrastructure 3-1 of broadcast station A is a metropolitan area including Gyeonggi-do, a first infrastructure 3-2 of broadcast station B is Gangneung, and the electric field strengths thereof are above a reference value, so that Wonju may become the electric field overlapping area.

As described with reference to FIG. 6, the controller 110 may calculate the first broadcast station list, which is a candidate list of electric field overlapping areas, based on the current frequency set by the user and the current location of the vehicle 1 determined by the location receiver 104. In the instant case, the calculated first broadcast station list may include broadcast station A and broadcast station B. Accordingly, the name of a broadcast station to be displayed on the display device 102 may be 'KBS 1st Radio' of broadcast station A or 'KBS Classic FM' of broadcast station B.

The controller 110 may create the second broadcast station list in order to provide an accurate name of broadcast station, which is currently being transmitted, among broadcast station A and broadcast station B in the electric field overlapping area.

FIG. 8 is a view illustrating the second broadcast station list having the same broadcast station name as the first broadcast station list but a different frequency among broadcasting information of a database according to an embodiment. For example, the second broadcast station list may include a plurality of second broadcast information such as frequency (Mhz) information, location information, and broadcast station name information (c), and broadcast station location information.

The controller 110 may generate the second broadcast station list in which a broadcast station name is the same as that of the broadcasting information included in the first broadcast station list but a frequency thereof is different. In other words, the controller 110 generates the second broadcast station list in which the broadcast station name is the same as that of the first broadcast station list that is a list of candidates for the currently transmitted broadcast but a frequencies thereof are different, thereby identifying which broadcast station is currently transmitting the broadcasting.

In other words, the controller 110 may determine the broadcast station name having the same audio sound as the audio sound transmitted from the vehicle 1 among the broadcasting information included in the second broadcast station list as the current radio station name in the electric field overlapping area.

In the second broadcast station list, a frequency transmitting the same broadcast as the currently transmitted broadcast may exist. The radio broadcasting transmits the same broadcast with different frequencies when the location of the broadcast station changes, so that the controller 110 may determine the broadcast station that transmits the broadcasting currently output from the vehicle 1 through audio comparison.

For example, in FIG. 8, assuming that the broadcasting currently output from the vehicle 1 is 'KBS 1 Radio', a frequency transmitting the same audio among different frequencies of KBS 1 Radio (b) in the second broadcast station list may exist.

As another example, if the broadcasting currently output from the vehicle 1 is 'KBS 1FM (Classic FM)', there may be a frequency transmitting the same audio among different frequencies of KBS 1FM (Classic FM) (a) in the second broadcast station list.

In other words, if the broadcast station is the same, the frequencies thereof are different but the broadcasting transmitted at the current time may be the same. Accordingly, by comparing with different frequencies, the broadcasting currently output from the vehicle 1 may be specified.

At this time, a method for the controller 110 to compare audio sounds may utilize a tuner and a sub tuner. In particular, the controller 110 may receive the audio sound signal transmitted from the broadcast station included in the second broadcast station list through the sub tuner, and determine, based on the correspondence between the received sound signal and the audio sound signal transmitted from the vehicle 1, whether the audio sound transmitted from the vehicle 1 and the audio sound of the second broadcast station list are the same.

Furthermore, in comparing the audio sounds, the controller 110 may determine a priority among the broadcasting information included in the second broadcast station list, and preferentially compare the audio sound of the broadcasting information having a higher priority with the audio sound transmitted from the vehicle 1.

In detail, the controller 110 may determine the broadcasting information having the same broadcast station location among the broadcasting information included in the second broadcast station list as a first priority, and determine the broadcasting information having a high electric field strength received by the vehicle 1 among broadcasting information included in the second broadcast station list as a second priority.

For example, if the broadcast station name (c) in the first broadcast station list is 'KBS 1 Radio' in FIG. 6, 'KBS 1 Radio' is located in in the metropolitan area, so that comparison between the audio sound thereof and that of 'KBS 1 Radio' having the frequency (a) of 90.3 in FIG. 8 may set a high priority.

Then, if a plurality of pieces of the broadcasting information having the same location of a broadcast station exist, the next priority may be set in the order of the strongest electric field strength according to the electric field strength received by the vehicle 1. Accordingly, a broadcasting that generates a lot of noise in audio sound due to weak electric field strength and is difficult to compare the audio sounds may be excluded from the comparison.

Therefore, the controller 110 may compare the audio sounds based on priorities, so that it is possible to efficiently provide radio station names in the electric field overlapping area.

Figure 9:
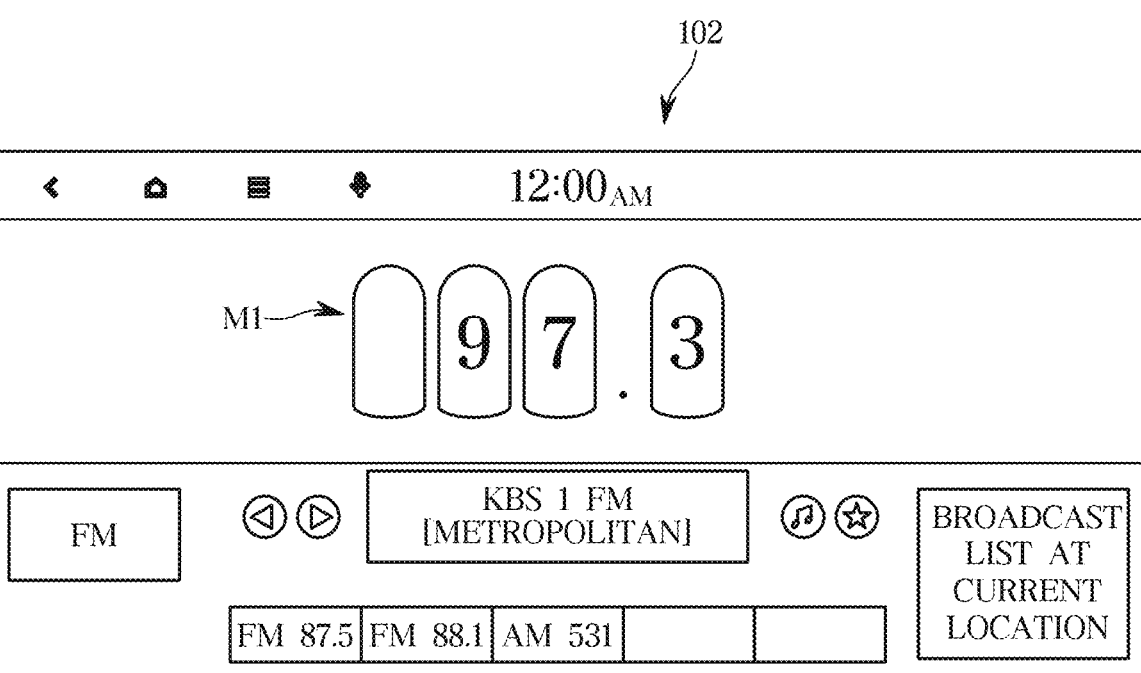
FIG. 9 is view illustrating an example of displaying broadcasting information on a display provided in a vehicle according to an embodiment of the present disclosure.

FIG. 9 is an example of displaying the broadcasting information on a display device provided in a vehicle according to an exemplary embodiment.

The broadcasting information may include broadcast station information corresponding to frequency information selected by a user, program information, broadcasting time information, and presenter information. The broadcast station information may include a broadcast station name, and the program information may include a program name.

The broadcasting time information may include information about a start time and an end time of broadcasting a program currently being output.

The display device 102 may display the broadcasting information as at least one of text and image.

The display device 102 may display frequency information selected by a user, display channel information, a broadcast station name, and additionally display a program name and host name as broadcasting information, and may display the items above as text.

The display device 102 may display frequency information selected by a user, display channel information, a broadcast station name, and additionally display a thumbnail image as broadcasting information.

The thumbnail image may be an image in which a picture of a host and a symbol corresponding to a program name are matched. The thumbnail image may be a photo image of the host or a symbol image corresponding to the program name.

The display device 102 may also display frequency information of different areas in which the same program as the currently outputting program is output as broadcasting information.

FIG. 10 is a control flowchart illustrating a method for controlling a vehicle according to an exemplary embodiment.

Referring to FIG. 10, the user may input a radio frequency to the input device of the vehicle 1 (1000). For example, the user may input the radio frequency, such as 97.3 Mhz. As a result, the controller 110 may receive the radio frequency and receive the current location information of the vehicle 1 from the location receiver 104 (1010).

Thereafter, the controller 110 may generate the first broadcast station list corresponding to the input frequency and the received location of the vehicle 1 (1020). At this time, the first broadcast station list is a list of candidates for broadcast station names of radio currently output to the vehicle 1.

Thereafter, the controller 110 may determine whether two or more broadcast stations are included in the generated first broadcast station list (1030). If it is not determined that there are two or more broadcast stations included in the first broadcast station list (No in 1030), the controller 110 may update the first broadcast station list.

If it is determined that there are two or more broadcast stations included in the first broadcast station list (Yes in 1030), the controller 110 may generate a second broadcast station list in which the broadcast station name is the same as that of the first broadcast station list but the frequency thereof is different (1040). In this case, the second broadcast station list is a comparison target of the list of candidates included in the first broadcast station list.

The controller 110 may compare the audio sound currently transmitted from the vehicle 1 with the audio sound of one of the second broadcast station list (1050), and then determine whether the audio sounds are the same (1060).

If the audio sound currently transmitted from the vehicle 1 and the audio sound of one of the second broadcast station list are not the same (No in 1060), the controller 110 may compare the audio sound currently transmitted from the vehicle 1 with the audio sound of another of the second broadcast station list. Accordingly, the controller 110 may compare the audio sound currently transmitted with the audio sounds of the second broadcast station list until an audio sound identical to the audio sound currently transmitted from the vehicle 1 is found.

If the audio sound currently transmitted from the vehicle 1 and the audio sound of one of the second broadcast station list are the same (Yes in 1060), the controller 110 may display broadcasting information that has determined as the same audio sound on the display device 102 (1070).

In other words, the name of the broadcast station, in which the controller 110 has determined that the audio sound currently transmitted from the vehicle 1 is the same as the audio sound of one of the second broadcast station list, is the name of the currently transmitted broadcast station. Accordingly, the controller 110 may display the name of the broadcast station on the display device 102, thereby providing the broadcast station name even in the electric field overlapping area.

As apparently described above, various embodiment of the present disclosure may identify the currently received broadcast and provide the broadcast station name even in the electric field overlapping area, thereby improving convenience of a user.

Further, various embodiment of the present disclosure may efficiently compare audio sounds by determining whether audio sound signals correspond to each other based on a plurality of priority factors.

As such, the present disclosure may improve quality and marketability of an audio device and a vehicle having the same, moreover, may increase user satisfaction and improve vehicle safety, leading in securing product competitiveness.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle, comprising:
a display device;
a communicator configured to receive location information of the vehicle;
a tuner configured to receive a radio frequency signal;

a database including a plurality of broadcasting information which are categorized by area; and a controller configured to:

generate a first broadcast station list including a plurality of first broadcasting information corresponding to the location information of the vehicle and the radio frequency signal among the plurality of broadcasting information included in the database;

generate a second broadcast station list including broadcast station names in the first broadcast station list with different frequency information from the first broadcast station list;

compare audio sound transmitted from the vehicle with audio sounds transmitted from broadcast stations of the broadcast station names included in the second broadcast station list to determine a current broadcast station name in an electric field overlapping area; and control the display device to display the determined current broadcast station name, wherein the controller is further configured to:

determine a priority of each of a plurality of second broadcasting information included in the second broadcast station list, and compare an audio sound of at least one of the plurality of second broadcasting information having a highest priority with the audio sound transmitted from the vehicle.

2. The vehicle of claim 1, wherein the controller is further configured to determine a broadcast station name of a broadcast station transmitting the same audio sound as the audio sound transmitted from the vehicle, among the broadcast station names in the second broadcast station list, as the current broadcast station name in the electric field overlapping area.

3. The vehicle of claim 2, further comprising: a sub tuner, and wherein the controller is further configured to:

receive audio sound signals transmitted from broadcast stations of the broadcast station names included in the second broadcast station list through the sub tuner, and determine, based on at least one of the audio sound signals received through the sub tuner corresponds to the audio sound signal transmitted from the vehicle, that the audio sound transmitted from the vehicle and at least one audio sound of the second broadcast station list are the same.

4. The vehicle of claim 1, wherein the controller is further configured to determine broadcasting information having the same broadcast station location as the first broadcast station list among the plurality of second broadcasting information included in the second broadcast station list to have a first priority.

5. The vehicle of claim 1, wherein the controller is further configured to determine broadcasting information having a high electric field strength received by the vehicle, among the plurality of second broadcasting information included in the second broadcast station list to have a second priority.

6. The vehicle of claim 1, wherein the plurality of the first broadcasting information includes at least one of radio frequency information, radio transmission area information, and broadcast station location information.

7. The vehicle of claim 1, wherein the controller is further configured to control the display device to display broadcasting information corresponding to the determined current broadcast station name as text or a thumbnail image.

8. The vehicle of claim 7, wherein the broadcasting information corresponding to the determined current broadcast station name includes at least one of a program name, a host, and air time.

9. A method of controlling a vehicle including a display device, a communicator for receiving location information thereof, and a tuner for receiving a radio frequency signal, the method comprising:

generating a first broadcast station list including a plurality of first broadcasting information corresponding to the location information of the vehicle and the radio frequency signal;

generating a second broadcast station list including broadcast station names in the first broadcast station list with different frequency information from the first broadcast station list;

determining a current broadcast station name in an electric field overlapping area by comparing audio sound transmitted from the vehicle with audio sounds transmitted from broadcast stations of the broadcast station names included in the second broadcast station list; and displaying the determined current broadcast station name, wherein comparing the audio sound transmitted from the vehicle with the audio sound transmitted from broadcast stations of the broadcast station names included in the second broadcast station list further comprises:

determining a priority of each of a plurality of second broadcasting information included in the second broadcast station list, and comparing an audio sound corresponding to broadcasting information having a highest priority with the audio sound transmitted from the vehicle.

10. The method of claim 9, wherein determining the current broadcast station name further comprises:

determining a broadcast station name of a broadcast station transmitting the same audio sound as the audio sound transmitted from the vehicle, among the broadcast station names in the second broadcast station list, as the current broadcast station name in the electric field overlapping area.

11. The method of claim 10, further comprising:

receiving audio sound signals transmitted from broadcast stations of the broadcast station names included in the second broadcast station list through a sub tuner, and determining, based on at least one of the audio sound signals received through the sub tuner corresponds to the audio sound signal transmitted from the vehicle, that the audio sound transmitted from the vehicle and at least one audio sound of the second broadcast station list are the same.

12. The method of claim 1, further comprising: determining broadcasting information having the same broadcast station location as the first broadcast station list, among the plurality of second broadcasting information included in the second broadcast station list, to have a first priority.

13. The method of claim 1, further comprising: determining broadcasting information having a high electric field strength received by the vehicle among the plurality of second broadcasting information included in the second broadcast station list to have a second priority.

14. The method of claim 9, wherein the plurality of the first broadcasting information includes at least one of radio frequency information, radio transmission area information, and broadcast station location information.

15. The method of claim 9, wherein displaying the determined broadcast station name further comprises controlling the display device to display broadcasting information corresponding to the determined current broadcast station name as text or a thumbnail image.

16. The method of claim 15, wherein the broadcasting information corresponding to the determined current broadcast station name includes at least one of a program name, a host, and air time.

* * * * *